B. S. LACY.
PROCESS OF MANUFACTURING PARAFFIN ETHERS.
APPLICATION FILED JULY 21, 1914.
1,245,742.
Patented Nov. 6, 1917.
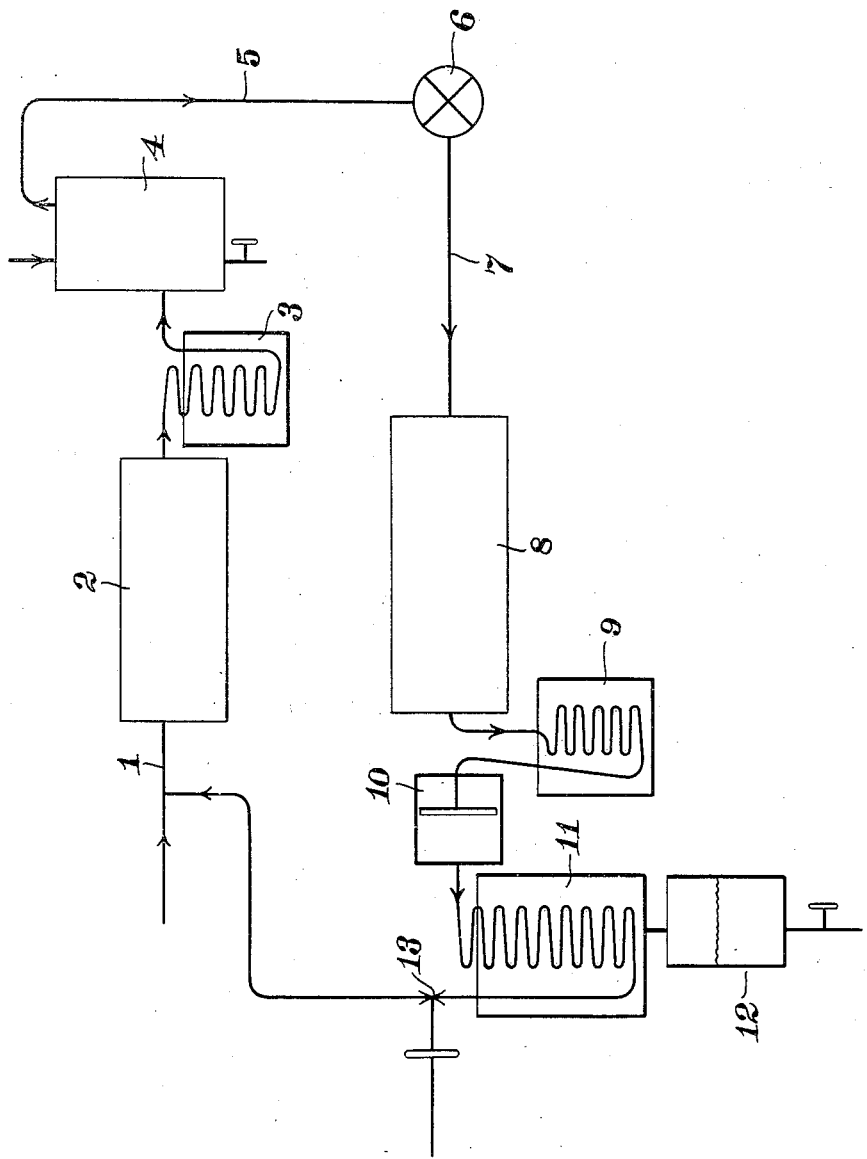
Witnesses:
Burritt S. Lacy,
Inventor

UNITED STATES PATENT OFFICE.

BURRITT S. LACY, OF SEWAREN, NEW JERSEY, ASSIGNOR TO THE ROESSLER & HASSLACHER CHEMICAL COMPANY, OF NEW YORK, N. Y., A CORPORATION OF NEW YORK.

PROCESS OF MANUFACTURING PARAFFIN ETHERS.

1,245,742.  Specification of Letters Patent.  Patented Nov. 6, 1917.

Application filed July 21, 1914. Serial No. 852,165.

*To all whom it may concern:*

Be it known that I, BURRITT S. LACY, a citizen of the United States, and a resident of Sewaren, in the county of Middlesex and State of New Jersey, have invented new and useful Improvements in Processes of Manufacturing Paraffin Ethers.

My invention relates to the process of manufacturing paraffin ethers, which I shall describe in its application to the case of manufacturing ethyl ether, and which I have discovered may be accomplished by means of the following reactions:

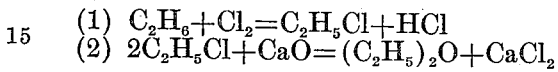

(1) $C_2H_6 + Cl_2 = C_2H_5Cl + HCl$
(2) $2C_2H_5Cl + CaO = (C_2H_5)_2O + CaCl_2$

I have discovered that under certain conditions the formation of ethers as exemplified by reaction (2) may be successfully carried out and with nearly quantitative yields. In connection with this fact I have found especially in working on a large scale, that the highly exothermic character of reaction (2) presents a serious difficulty due to the tendency to rapid decomposition and carbonization brought about by the heat of reaction itself. I have furthermore found, however, that this unfavorable heat evolution may be wholly neutralized and the reaction made entirely successful even on a large scale by means of admixture with the ethyl chlorid of a large amount of an inert gas.

Any one of a number of inert gases, for example nitrogen or methane may be employed, but I prefer to use the excess $C_2H_6$, which is already present with the $C_2H_5Cl$ when prepared according to reaction (1) as described in my copending application Serial No. 852,164 filed July 21, 1914, for the manufacture of ethyl chlorid since the process then becomes a continuous cycle with production of substantially only HCl, ethyl ether, and $CaCl_2$, without the necessity of first separating the $C_2H_5Cl$ as such.

The following example illustrates one way of carrying out my invention in the case of ethyl ether, reference being had to the accompanying drawing showing in a rather diagrammatic way one way of arranging the apparatus preferably used in the operation of my invention. Ethane and chlorin gas in the proportions of for instance 5 to 1 are mixed and passed through pipe 1 to a reaction vessel 2 which is maintained at a temperature of about 300°–550° C. This vessel is composed of or lined with a substance which like silica, earthen-ware or brick has little effect on the reaction materials, neither being attacked by the chlorin nor causing separation of carbon. From the reaction vessel the off gas, consisting essentially of HCl, $C_2H_5Cl$ and excess $C_2H_6$, is passed to a cooler 3 and then through a water absorption apparatus 4, preferably arranged on the counter current principle, and then through pipe 5 to a drier 6, to remove water vapor.

The off gas which has now a composition of approximately 4 parts by volume $C_2H_6$ and 1 part $C_2H_5Cl$, is next passed through pipe 7 to a reaction vessel 8 which is maintained at a temperature of about 250°–450° C. and is filled with calcium oxid in a granular or powdered form, which material is preferably kept moving in the opposite direction to the gas current by a suitable conveyer or other like means.

In this vessel 8 reaction (2) occurs:

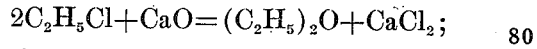

$$2C_2H_5Cl + CaO = (C_2H_5)_2O + CaCl_2;$$

the rise in temperature produced by the heat of reaction is only about 250° C., while when no diluting gas is admixed with the $C_2H_5Cl$ the temperature rise is over 1000° C. which explains the carbonization which is found to occur in the absence of a diluting gas.

From this reaction vessel 8 the off gas, which has now a composition substantially of four volumes $C_2H_6$ to one-half volume $(C_2H_5)_2O$ vapor, is first passed into a cooler 9 and then into a compressor 10 where it is compressed to about ten atmospheres. The compressed gas is now cooled in refrigerator 11 to about —20° C., by which means substantially all of the ether is separated out in the liquid state and is collected in vessel 12. Finally the off gas from the cooler 11, which is nearly pure $C_2H_6$ is, after expansion to about atmospheric pressure by means of expansion valve 13, again mixed with additional amounts of $C_2H_6$ and $Cl_2$ equivalent to those which have been removed by reaction, and the mixture is again passed into the original reaction vessel 2 where chlorination again occurs.

It is evident that in the above described process, starting with the reaction materials $C_2H_6$, $Cl_2$ and CaO, we obtain by an entirely continuous circulation process the reaction products $(C_2H_5)_2O$, HCl and $CaCl_2$.

It is of course understood that I do not limit myself to the exact reactions or method of operation above described, as considerable changes may be made without departing from the spirit of the invention. Thus the method may be equally well applied to the manufacture of other paraffin ethers, in particular to that of methyl ether, which may be prepared by reaction similar to reaction (2), or the preparation of methyl chlorid as described in U. S. Patent No. 1,111,842, issued to me Sept. 29, 1914, may be combined with the reaction set forth giving a continuous cyclical process of manufacturing methyl ether from methane, chlorin and calcium oxid.

Further, I have found that other oxids for example those of the alkali and alkaline earth metals, as well as of metals such as lead, mercury, silver, etc., may be successfully used instead of calcium oxid, though I prefer to use the latter on account of its great efficiency and cheapness.

In my copending application Serial No. 852,164 I have described a method of making ethyl chlorid involved in some of the claims of the present case but claimed *per se* in said copending application.

What I claim is:

1. The process of manufacturing paraffin ethers, comprising acting on the mixture of the vapors of a hydro-carbon chlorid and of an inert gas with a basic oxid at an elevated temperature.

2. The process of manufacturing paraffin ethers, comprising acting on the mixture of the vapors of a hydro-carbon chlorid and an inert gas with calcium oxid at an elevated temperature.

3. The process of manufacturing paraffin ethers, comprising acting on the mixture of the vapors of a hydro-carbon chlorid and an inert gas with calcium oxid at a temperature of from 250° C. to 450° C.

4. The process of manufacturing ethyl-ether, consisting in passing a mixture of ethyl-chlorid and of an inert gas over calcium-oxid at an elevated temperature.

5. The process of manufacturing ethyl-ether, consisting in passing a mixture of ethyl-chlorid and of an inert gas over calcium oxid at a temperature of from 250° to 450° C.

6. The cyclic process of manufacturing ethyl-ether, consisting in mixing ethane with a smaller volume of chlorin, exposing this mixture to a temperature of approximately 300°–550° C. while passing through a suitable reaction vessel, cooling the reaction products, separating the generated hydrochloric acid from said products, passing the remaining mixture of ethyl-chlorid and unused ethane over calcium oxid at a high temperature, separating the generated ether vapor from the excess of ethane and using the latter over again in the process.

7. The cyclic process of manufacturing ethyl ether, consisting in mixing chlorin gas with not less than approximately three volumes of ethane, exposing this mixture to a temperature of approximately 300–550° C. while passing through a suitable reaction vessel, cooling the reaction products, separating the generated hydro-chloric acid from same, drying the remaining mixture of ethyl-chlorid and excess of ethane, passing the dry gas mixture over calcium oxid at a temperature of approximately 250°–450° C., separating the generated ether vapor from the excess of ethane and using the latter over again in the process.

8. The cyclic process of manufacturing ethyl ether, consisting in mixing chlorin gas with not less than approximately three volumes of ethane, exposing this mixture to a temperature of approximately 300–550° C. while passing through a suitable reaction vessel, cooling the reaction products, separating the generated hydrochloric acid from same, drying the remaining mixture of ethyl-chlorid and excess of ethane, passing then the dry gas mixture over calcium oxid at a temperature of approximately 250–450° C., cooling the reaction mixture consisting of ether vapor and excess of ethane, compressing that mixture and cooling it while in the compressed state, separating the liquefied ether and the excess of ethane and using the latter over again in the process.

9. The cyclic process of manufacturing ethyl-ether, consisting in mixing one volume of chlorin gas with not less than approximately three volumes of ethane, exposing this mixture to a temperature of approximately 300–550° C. while passing through a suitable reaction vessel, cooling the reaction products, separating the generated hydrochloric acid from same by water, removing the moisture from the remaining mixture of ethyl-chlorid and excess of ethane, passing then the dry gas mixture over calcium-oxid at a temperature of approximately 250–450° C., cooling the reaction product, compressing the same and cooling it while in the compressed state, separating the liquefied ether from the excess of ethane and using the latter over again in the process.

In testimony whereof I have signed this specification in the presence of two subscribing witnesses.

BURRITT S. LACY.

Witnesses:
CATHERINE A. COSTELLO,
OTTO K. ZWINGENBERGER.